(12) United States Patent
Lynch et al.

(10) Patent No.: US 12,469,369 B2
(45) Date of Patent: Nov. 11, 2025

(54) POINT-OF-SALE SYSTEM WITH MULTIPLE SHROUDS

(71) Applicant: InVue Security Products Inc., Charlotte, NC (US)

(72) Inventors: Laura Abbott Lynch, Charlotte, NC (US); Daniel C. Symons, Waxhaw, NC (US); Steven R. Maitin, Waxhaw, NC (US); Joshua Abdollahzadeh, Denver, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 18/210,718

(22) Filed: Jun. 16, 2023

(65) Prior Publication Data
US 2023/0410613 A1    Dec. 21, 2023

Related U.S. Application Data

(60) Provisional application No. 63/441,492, filed on Jan. 27, 2023, provisional application No. 63/353,113, filed on Jun. 17, 2022.

(51) Int. Cl.
*G07G 1/00*      (2006.01)

(52) U.S. Cl.
CPC .................. *G07G 1/0018* (2013.01)

(58) Field of Classification Search
CPC ..... G07G 1/0018; G06Q 20/20; G06Q 20/204
USPC ................ 235/383, 380; 705/16, 17; 902/22
See application file for complete search history.

(56) References Cited

U.S. PATENT DOCUMENTS

| | | | |
|---|---|---|---|
| 2012/0286048 A1* | 11/2012 | Liu | G06F 9/4413 235/462.48 |
| 2013/0264234 A1 | 10/2013 | Cohen | |
| 2016/0224065 A1* | 8/2016 | Weldon | G06F 1/1632 |
| 2016/0247138 A1 | 8/2016 | Wallner | |
| 2016/0321485 A1* | 11/2016 | Utykanski | G06K 7/10831 |

(Continued)

FOREIGN PATENT DOCUMENTS

WO     2023014980 A1    2/2023

OTHER PUBLICATIONS

The International Search Report and the Written Opinion from corresponding International Application No. PCT/US23/025509, date Oct. 10, 2023 (10 pages).

*Primary Examiner* — Suezu Ellis
(74) *Attorney, Agent, or Firm* — InVue Security Products Inc.

(57) ABSTRACT

A point of sale system is provided. The point of sale system includes a portable electronic device and a first shroud configured to be coupled to the portable electronic device. The system also includes a point of sale device configured to communicate with the portable electronic device, and a second shroud configured to be coupled to the point of sale device. The system further includes an accessory device configured to communicate with the portable electronic device and a third shroud configured to be coupled to the accessory device. The first shroud is configured to be removably attached to the first shroud to facilitate communication between the portable electronic device and the point of sale device, and the third shroud is configured to be removably attached to the first shroud to facilitate communication between the portable electronic device and the accessory device.

21 Claims, 18 Drawing Sheets

(56) References Cited

U.S. PATENT DOCUMENTS

| | | |
|---|---|---|
| 2017/0276289 A1* | 9/2017 | Phillips .................... H02B 1/01 |
| 2019/0034899 A1 | 1/2019 | Speagle et al. |
| 2019/0125249 A1 | 5/2019 | Rattner et al. |
| 2020/0242589 A1 | 7/2020 | Rao |
| 2022/0138972 A1 | 5/2022 | Rattner et al. |
| 2022/0154874 A1 | 5/2022 | Phillips et al. |

* cited by examiner

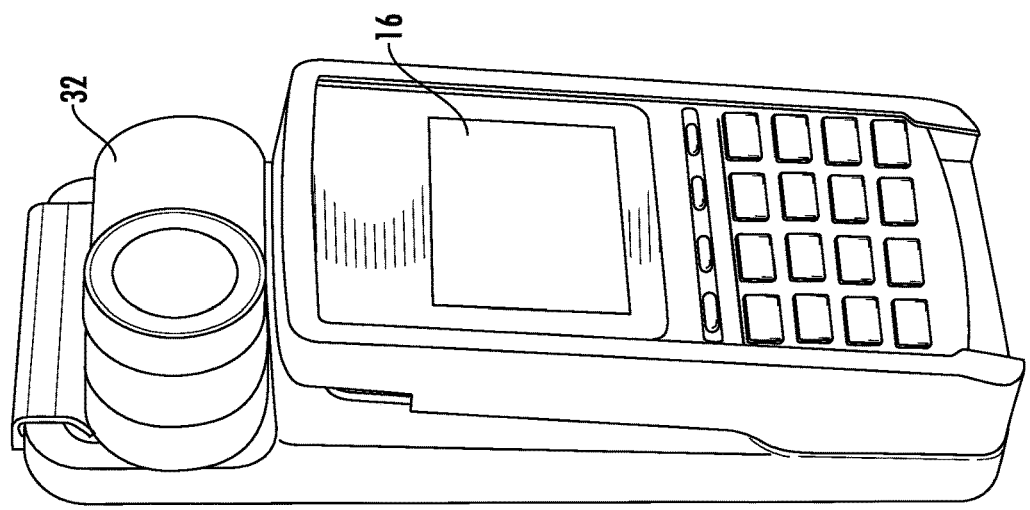
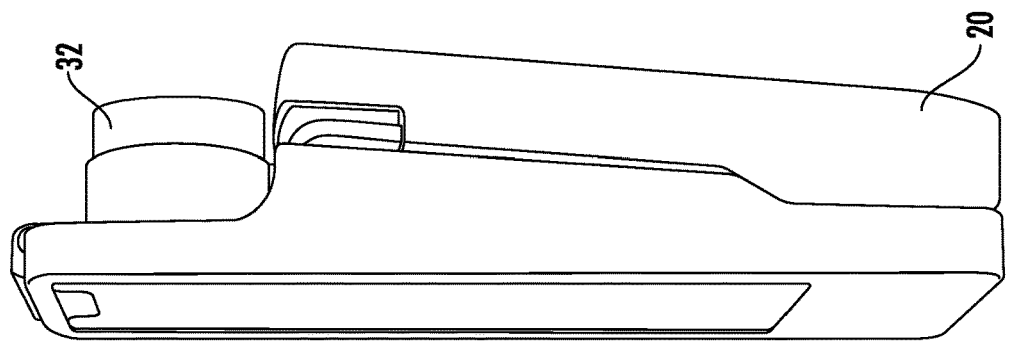
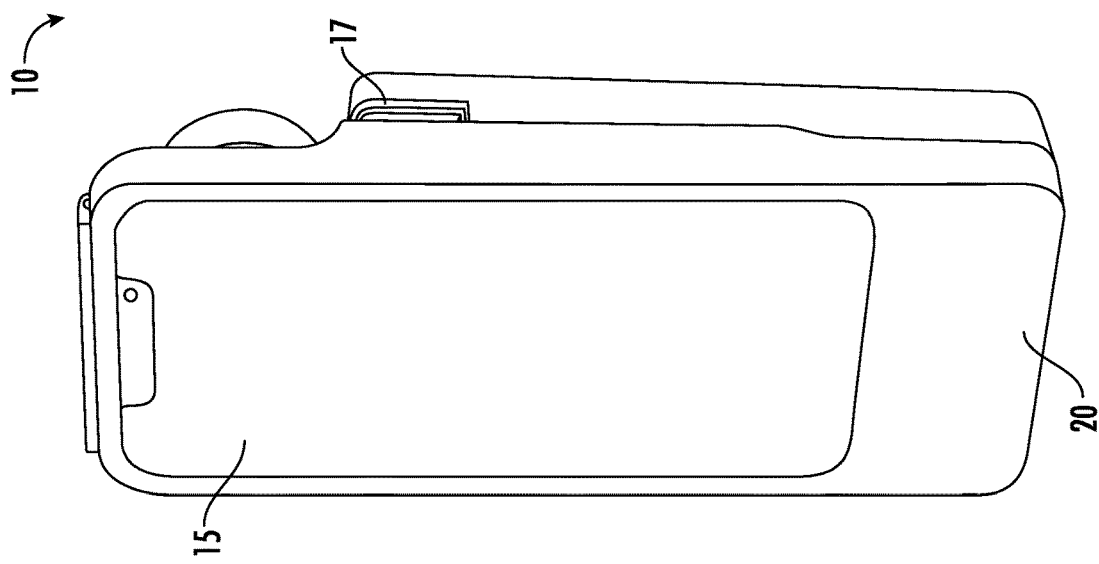
FIG. 1

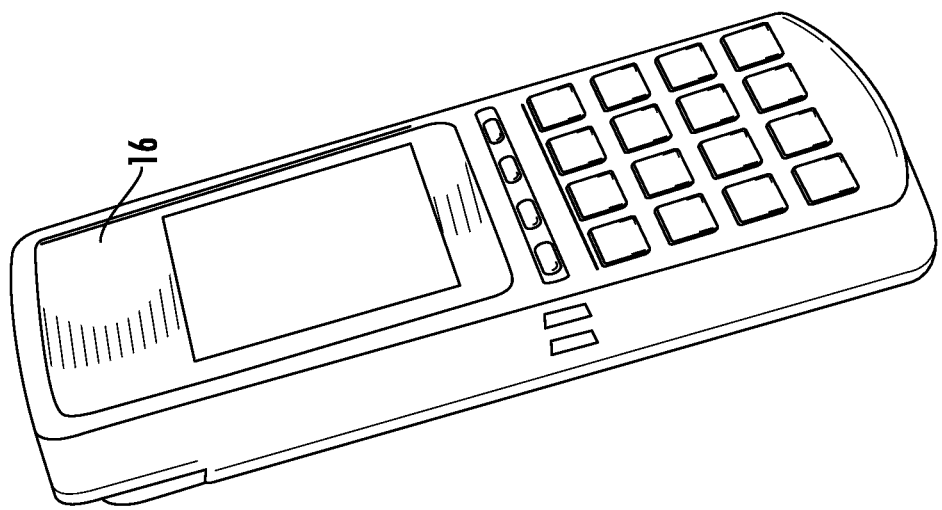
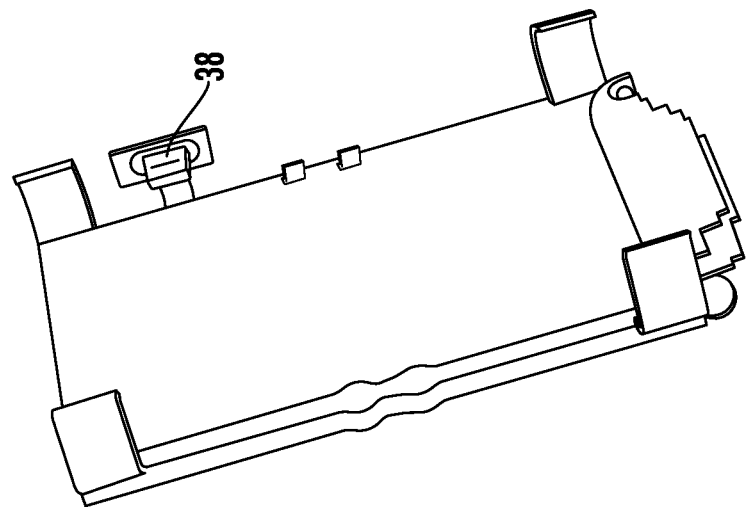
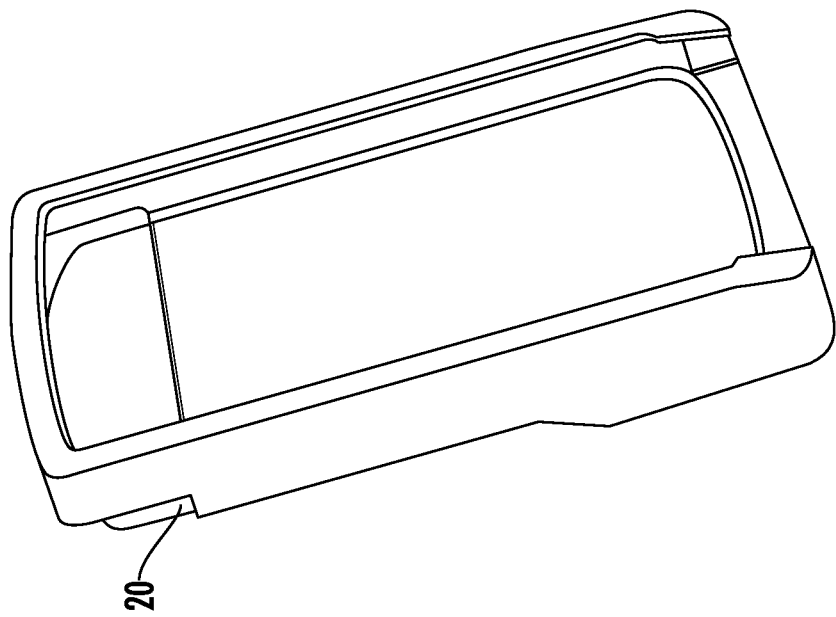
FIG. 6

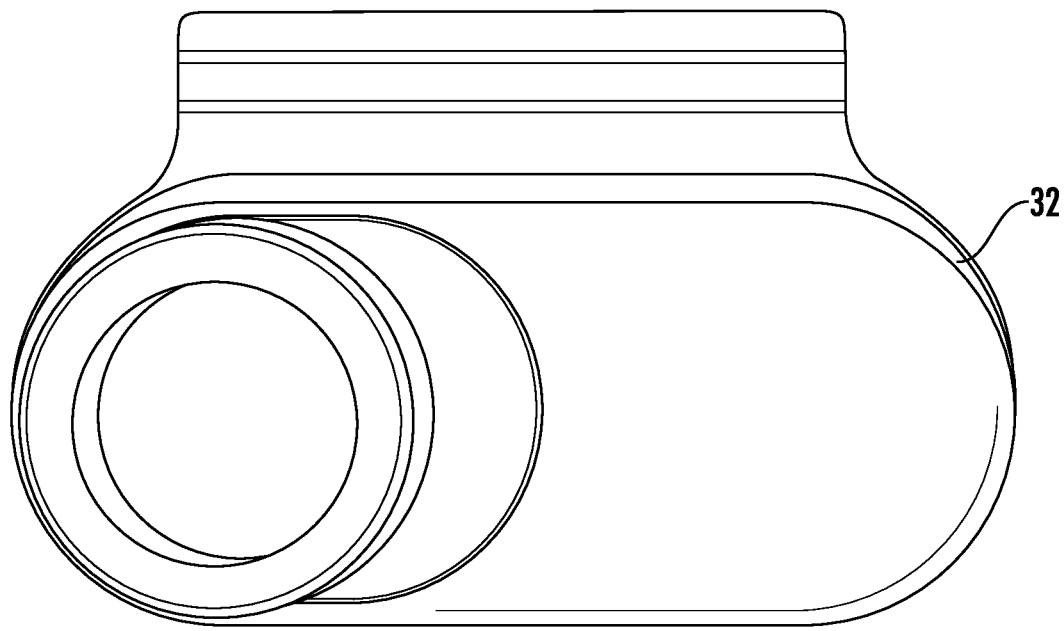
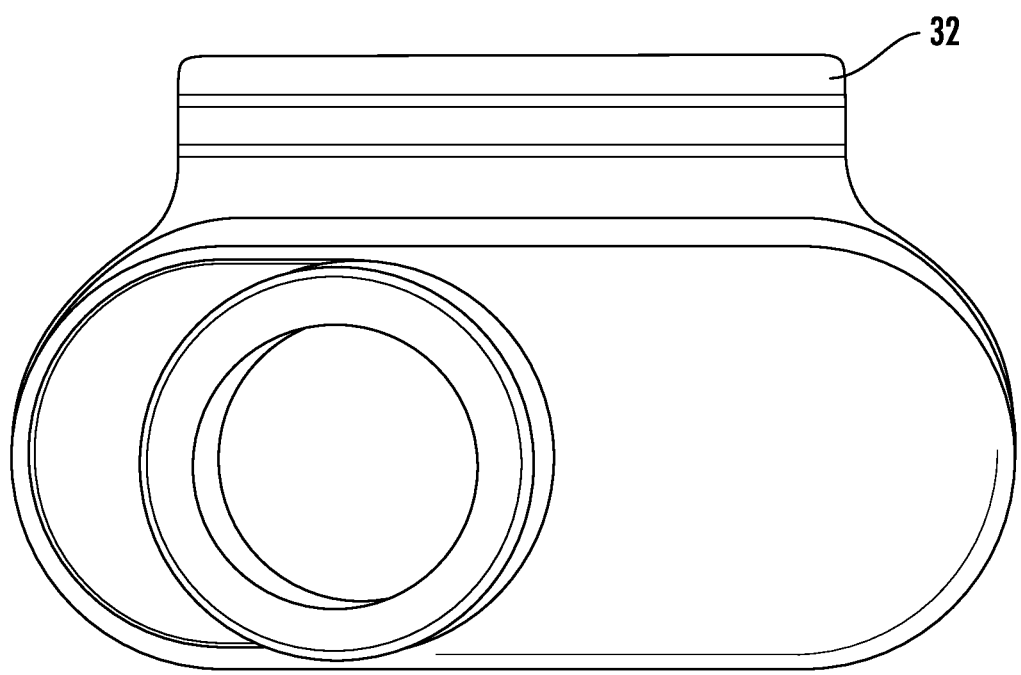
FIG. 7

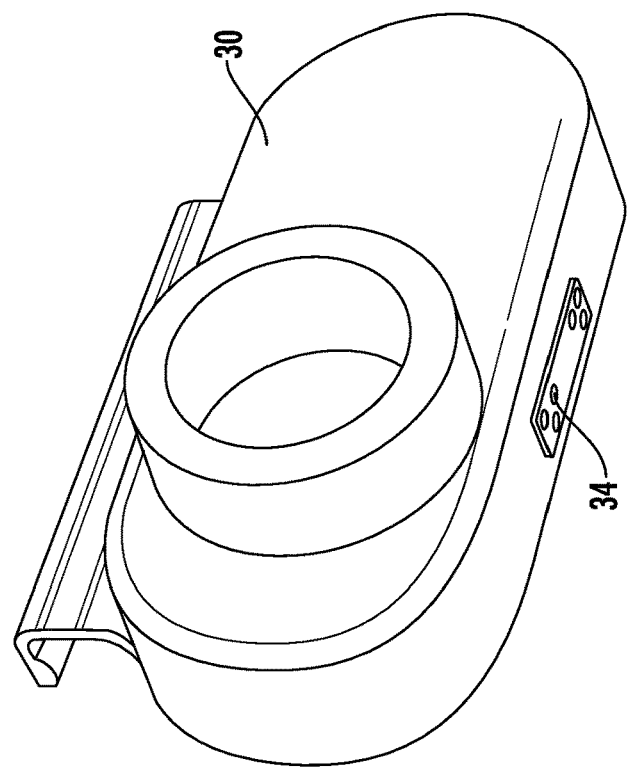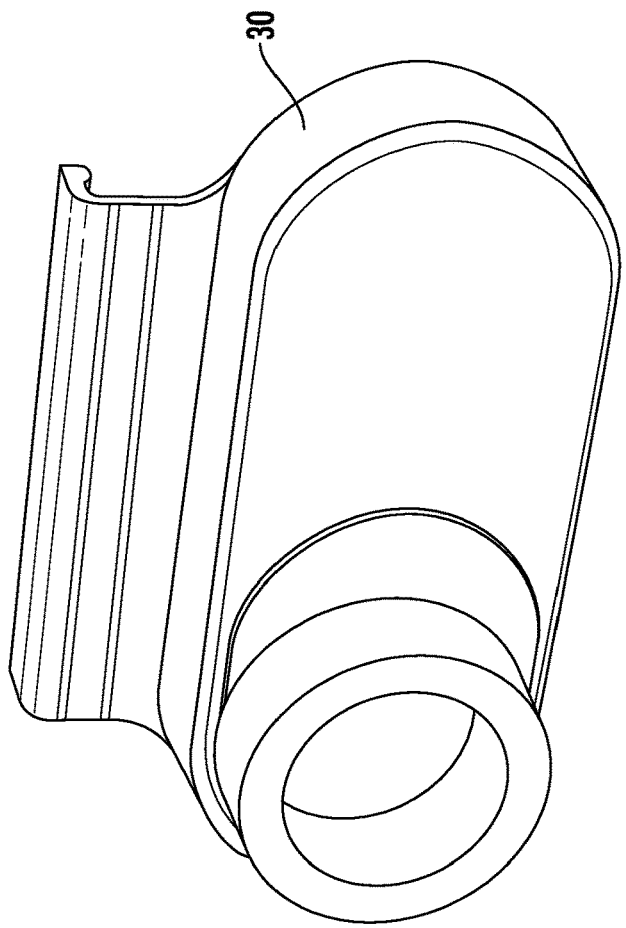
FIG. 9

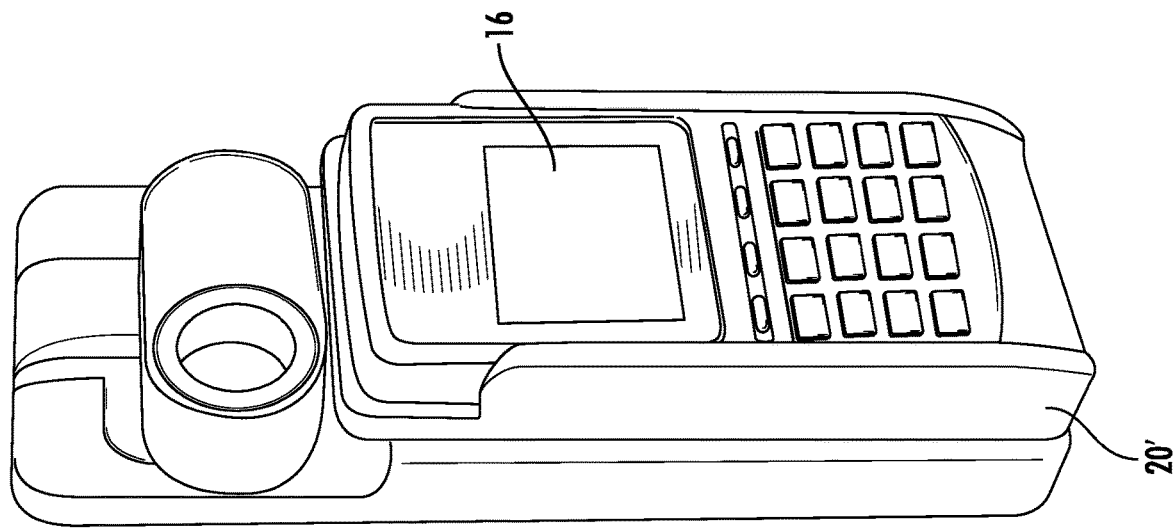
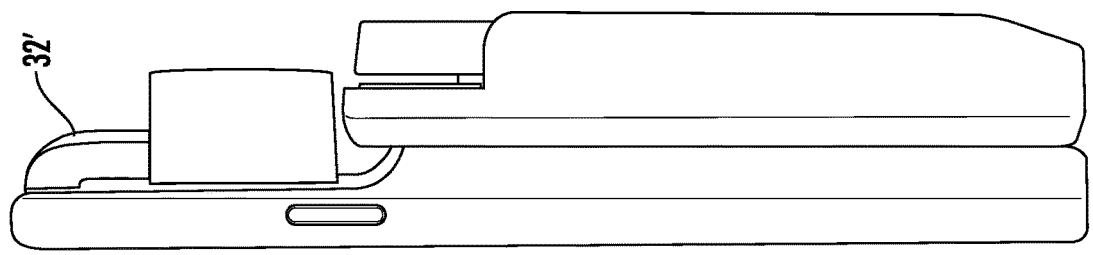
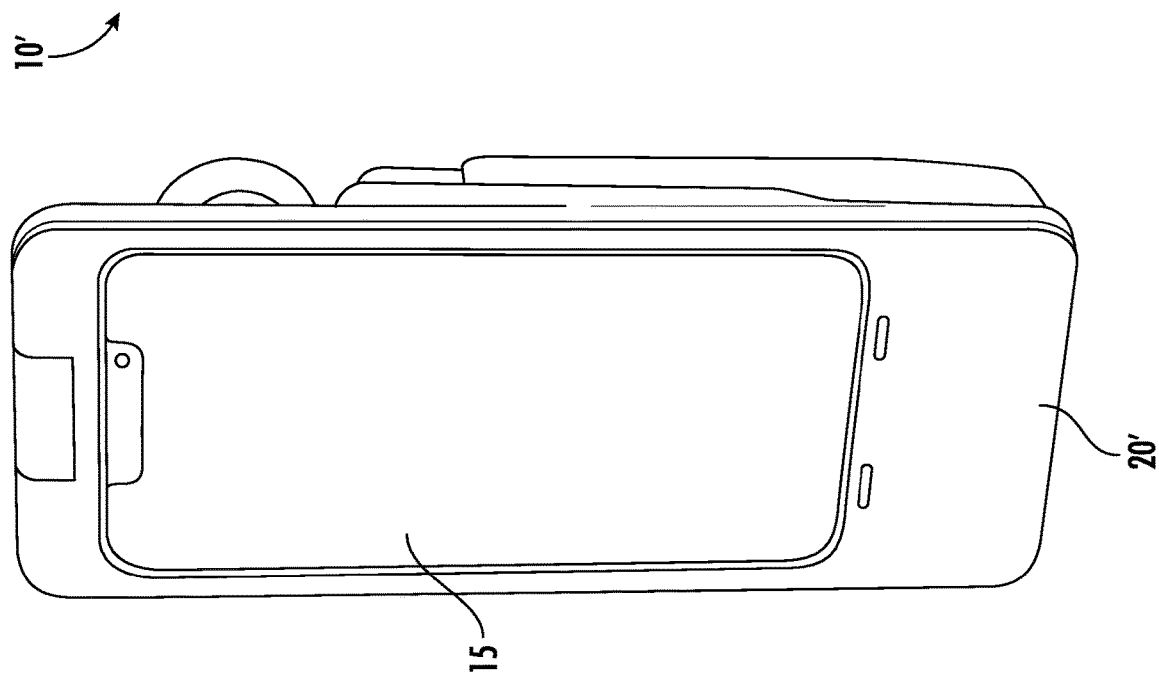
FIG. 13

POINT-OF-SALE SYSTEM WITH MULTIPLE SHROUDS

FIELD OF THE INVENTION

This application claims the benefit of priority to U.S. Provisional Application No. 63/353,113 filed on Jun. 17, 2022, and U.S. Provisional Application No. 63/441,492 filed on Jan. 27, 2023, the entire contents of each of which are hereby incorporated by reference herein.

BACKGROUND OF THE INVENTION

A recent trend in work and retail store environments is to use smart devices, sometimes cellphones, but more often tablets, as customer service devices. This usage takes on two forms. One form is using a tablet as a kiosk where customers can interact with the device. This may be used to deliver information about the establishment or its products to the consumer, or to act as an interface for customer loyalty programs in lieu of plastic cards. A second usage is for retail store associates to carry such a device around the store to assist customers. The associate may use the device to display a layout of the store to show a customer where an item is, check on a price of an item, or access information regarding a product the customer is buying. In some stores, phones or tablets are being used to check-out customers. Restaurants may use smart devices at a table for ordering or game playing. Hospitals may allow doctors and nurses to carry smart devices for mobile access to patient health charts.

BRIEF SUMMARY

Embodiments of the present invention are directed towards point of sale systems, docks, and methods. In one embodiment, a point of sale system includes a portable electronic device and a first shroud configured to be coupled to the portable electronic device. The point of sale system further includes a point of sale device configured to communicate with the portable electronic device. The point of sale system also includes a second shroud configured to be coupled to the point of sale device, and the point of sale system additionally includes an accessory device configured to communicate with the portable electronic device and a third shroud configured to be coupled to the accessory device. The first shroud is configured to be coupled (e.g., removably attached) to the second shroud to facilitate communication between the portable electronic device and the point of sale device, and the third shroud is configured to be coupled (e.g., removably attached) to the first shroud to facilitate communication between the portable electronic device and the accessory device.

In another embodiment, a point of sale system includes a portable electronic device and a first shroud configured to be coupled to the portable electronic device. The point of sale system additionally includes an accessory device configured to communicate with the portable electronic device and a second shroud configured to be coupled to the accessory device. The second shroud is configured to be moved relative to the first shroud between a use position in which the accessory device is configured to operate with the portable electronic device and a non-use position where the accessory device is unable to operate with the portable electronic device. In addition, the second shroud is configured to be coupled to the first shroud to facilitate communication between the portable electronic device and the accessory device. In some cases, the point of sale system may include a point of sale device configured to communicate with the portable electronic device and a third shroud configured to be coupled to the point of sale device.

In another embodiment, a method includes coupling a first shroud to a portable electronic device, coupling a second shroud to a point of sale device, and coupling a third shroud to an accessory device. The method also includes coupling the first shroud to the second shroud to facilitate communication between the portable electronic device and the point of sale device, and coupling the third shroud to the first shroud to facilitate communication between the portable electronic device and the accessory device.

BRIEF DESCRIPTION OF THE DRAWINGS

FIG. 1 illustrates various views of a point of sale system according to one embodiment.

FIG. 6 illustrates a shroud assembly for a point of sale device according to one embodiment.

FIG. 7 shows front views of a third shroud with an accessory device located at different positions relative to the third shroud according to one embodiment.

FIG. 9 illustrates various perspective views of a third shroud according to one embodiment.

FIG. 13 shows various views of a point of sale system according to another embodiment.

DETAILED DESCRIPTION OF EMBODIMENTS OF THE INVENTION

Figure 2:
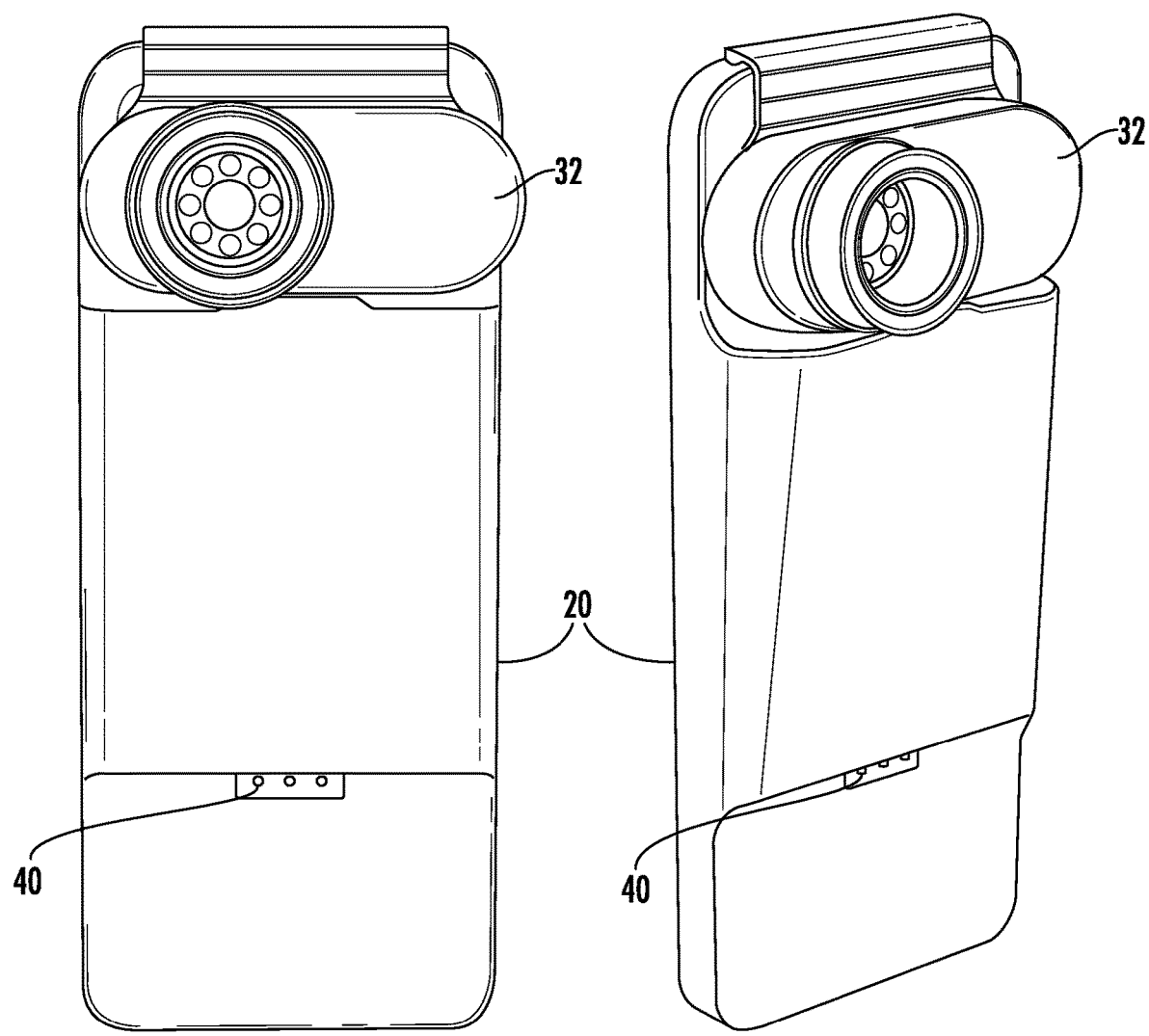
FIG. 2 illustrates additional views of the point of sale system of FIG. 1.
Figure 3:
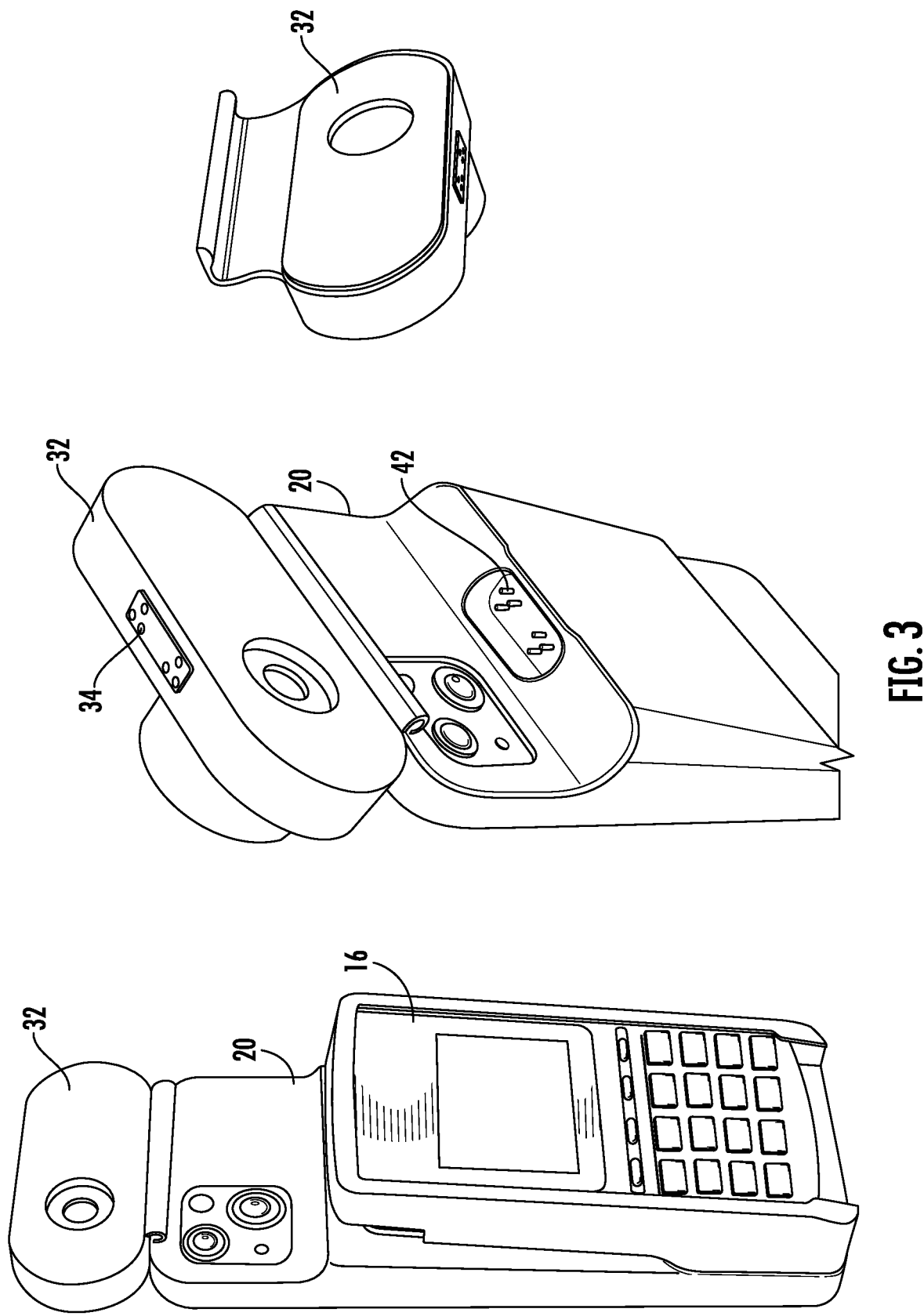
FIG. 3 shows various views of a third shroud for an accessory device and the third shroud in a non-use position according to one embodiment.
Figure 4:
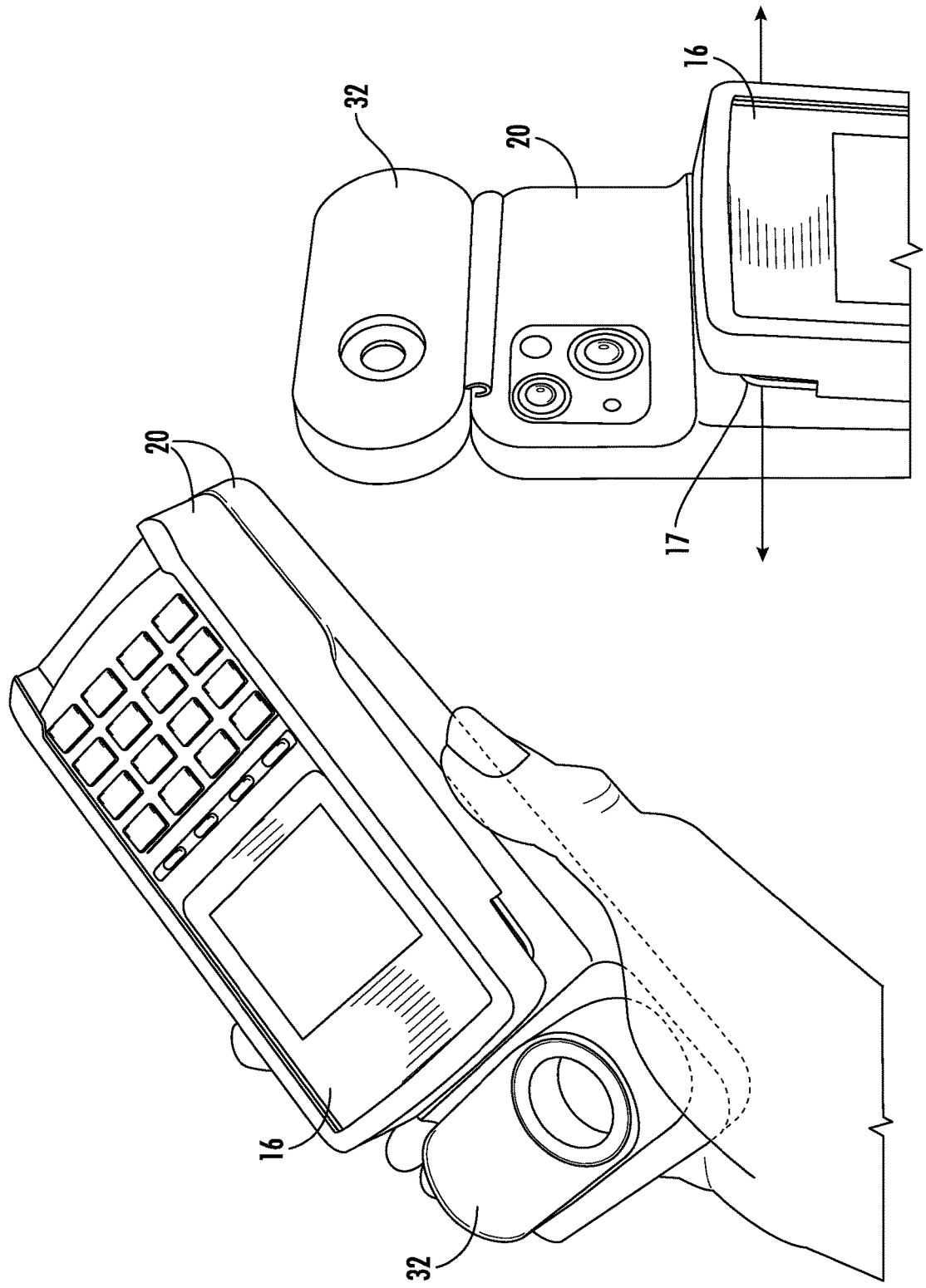
FIG. 4 shows the point of sale system of FIG. 1 with the third shroud in a use position along with an enlarged view of the point of sale device showing a card slot according to one embodiment.

Reference will now be made to the accompanying drawing figures wherein identical reference numerals denote the same or similar parts, elements, components, assemblies, subassemblies or the like throughout the various views. The attached drawing figures show exemplary embodiments of a point of sale or "POS" system 10 for a portable electronic device 15, for example, a phone, tablet, and/or a point-of-sale device. As used herein, the term "portable electronic device" is intended to include without limitation all types of portable, personal computers, for example, smartphones, tablets, laptops, notebooks, mini-notebooks, sub-notebooks and netbook type computers, as well as personal data assistant (PDA) and personal mobile communications (e.g., cell phone) type devices. As used herein, the term "point of sale" or "POS" device is intended to include without limitation various forms of devices for completing a transaction, such as a card reader, chip card reader, magnetic stripe reader, EMV reader, or the like. The POS system 10 may be suitable for use by customers or employees, such as a retail store associate, a teacher, a nurse, a doctor, a maintenance worker, or an airline pilot/attendant, in a variety of locations and environments.

FIGS. 1-4 show a portable electronic device 15, and in particular a cellular phone, and a point of sale device 16 for use with a POS system 10 according to one embodiment of the invention. In one embodiment, the POS system 10 includes a shroud 20, frame, sleeve, case, or the like that is configured to be attached to a respective portable electronic device 15 and/or point of sale device 16. The shroud 20 is configured to be coupled to the portable electronic device 15 or point of sale device 16 and in some instances, at least partially receive and surround the portable electronic device or the point of sale device. For instance, the shroud 20 may be configured to surround the outer edges of the point of sale device 15 or POS device and in some cases also cover the rear surface of the portable electronic device or the POS device. The shroud 20 may be a rigid or semi-rigid plastic in some cases. Thus, either or both of the portable electronic device 15 and the point of sale device 16 may include a shroud 20. In the illustrated embodiments, both the portable electronic device 15 and the POS device 16 include a respective shroud 20. In one example, the shroud 20 of the POS device 16 may include a card slot 17 configured to align with a card slot provided on the POS device (e.g., for sliding or inserting a credit card) (see, e.g., FIG. 4).

In some embodiments, the shrouds 20 may be configured to be removably attached to one another. In some cases, a rear surface of each of the shrouds 20 is configured to attach to one another such that each of the portable electronic device 15 and POS device 16 are usable when attached to one another. For example, the shrouds 20 may include one or more engagement members 22 that are configured to align with and engage one other. In some cases, the shrouds 20 may be configured to slide or snap between engaged and disengaged positions. In some cases, the shrouds 20 may also or alternatively include one or magnets and/or magnetically attractable material to facilitate alignment and engagement with one another, including at predetermined positions. As shown in the illustrated examples, the shrouds 20 may be configured to attach to one another such that the portable electronic device 15 and the POS device 16 face in opposite directions to one another. In some advantageous embodiments, different shrouds 20 are configured to be swapped with one another such as for different sizes, makes, and/or models of the portable electronic device 15 and/or the POS device 16. For instance, a portable electronic device 15 and associated shroud 20 may be configured to attach to and operate with a plurality of different types of POS devices 16 and associated shrouds. Similarly, a POS device 16 and associated shroud 20 may be configured to attach to and operate with a plurality of different types of portable electronic devices 15 and associated shrouds.

Figure 8:
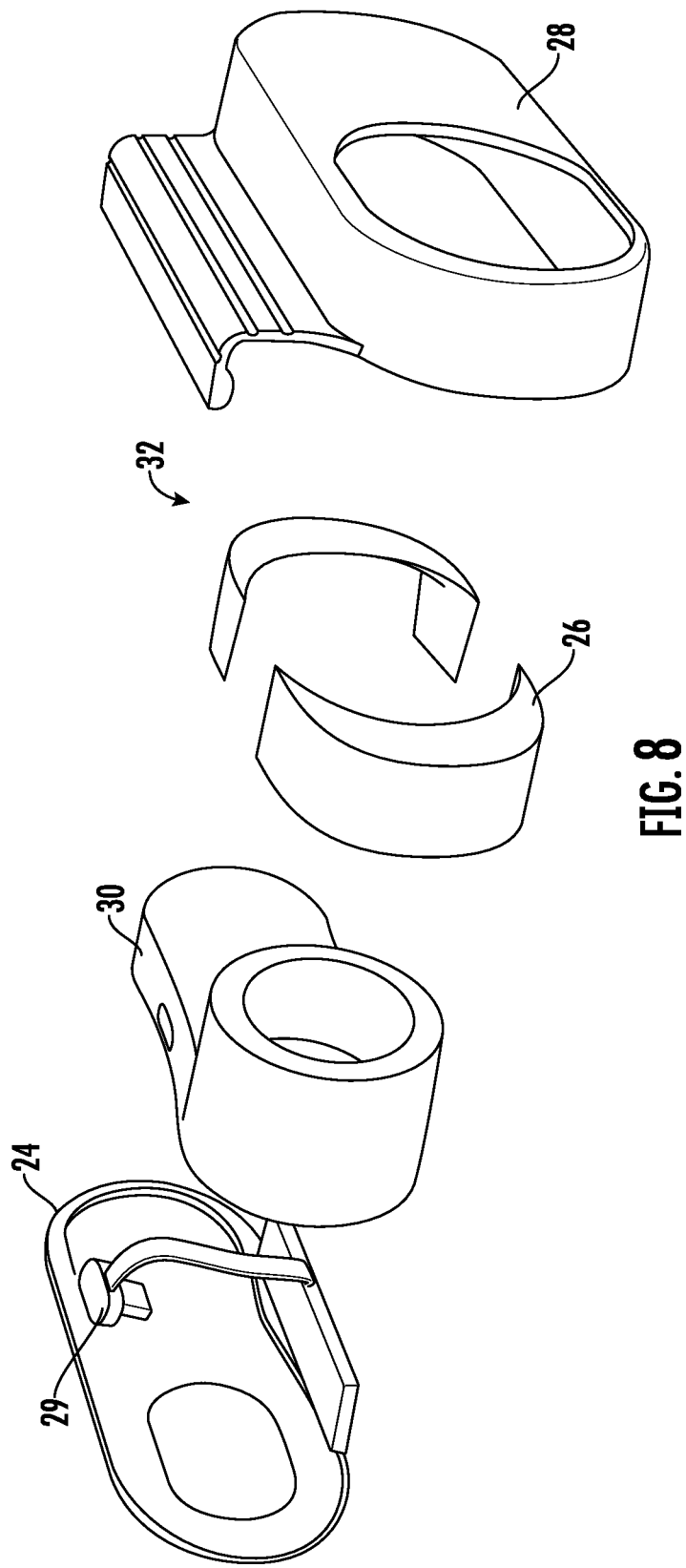
FIG. 8 shows an exploded view of a third shroud according to one embodiment.

The accompanying figures also illustrate that the system 10 may include an accessory device 30 (see, e.g., FIG. 8). The accessory device 30 may be configured to be removably attached to either of the shrouds 20. In the illustrated embodiments, the accessory device 30 is removably attached to the shroud 20 of the portable electronic device 15. In one example, the accessory device 30 is a Fitskin® device configured to be attached to a portable electronic device and to perform various skin analysis on a person, as described in U.S. Publication No. 2019/0125249, entitled Systems and Method for Skin Analysis Using Electronic Devices, the entire contents of which are incorporated by reference herein. The accessory device 30 may utilize one or more cameras of the portable electronic device 15 for taking images, videos, etc. In some instances, the shroud 20 of the POS device 16 may need to be removed from the shroud 20 of the portable electronic device 15 in order to correctly operate the accessory device 30.

The accessory device 30 may also include a shroud 32 that is configured to at least partially surround the accessory device (see, e.g., FIG. 8). FIG. 8 demonstrates that the shroud 32 may comprise a plurality of components, including a back plate 24, one or more spacers 26, and a front plate 28, which may be engaged or attached in any desired manner (e.g., snap fit). The back plate 24 may include a power connector 29 configured to engage a power port of the accessory device 30 as well as alignment features for aligning the accessory device. The spacers 26 may be used to ensure that the accessory device 30 is properly aligned relative to the camera of the portable electronic device 15 depending on the location of the particular camera. For instance, FIG. 7 shows that the accessory device 30 may be positioned at different locations relative to the shroud 32, which may depend on the position of the portable electronic device's 15 camera. The front plate 28 may define an opening allowing the accessory device 30 to have an unobstructed field of view. In addition, the shroud 32 may have an L-shaped portion in some cases that is configured to conform to two surfaces of the shroud 20 of the portable electronic device 15 (e.g., top and back surfaces).

Moreover, the front plate 28 may also be configured to allow the shroud 32 to hinge or otherwise pivot relative to the portable electronic device 15 between use and non-use positions. In the use position, the shroud 32 is coupled to the shroud 20 in a way that allows the accessory device 30 to operate or otherwise interface with the portable electronic device 15 (e.g., via a camera). In some cases, the hinge may be akin to a "living hinge", although other types of hinges may be used. Thus, the hinge may comprise a flexible material in some cases and/or include one or more areas of weakness to allow hinging. The shroud 32 may be configured to hinge to a hinged, non-use position to allow access to the card slot 17 of the POS device 17 (see, e.g., FIGS. 3-4). In some embodiments, the shroud 32 may also or alternatively include one or magnets and/or magnetically attractable material to facilitate alignment and engagement with the portable electronic device 15, such as for maintaining the shroud 32 in the hinged position. In one embodiment, the shroud 32 is attached to portable electronic device 15 only via one or more magnets and/or magnetically attractable material.

Figure 10:
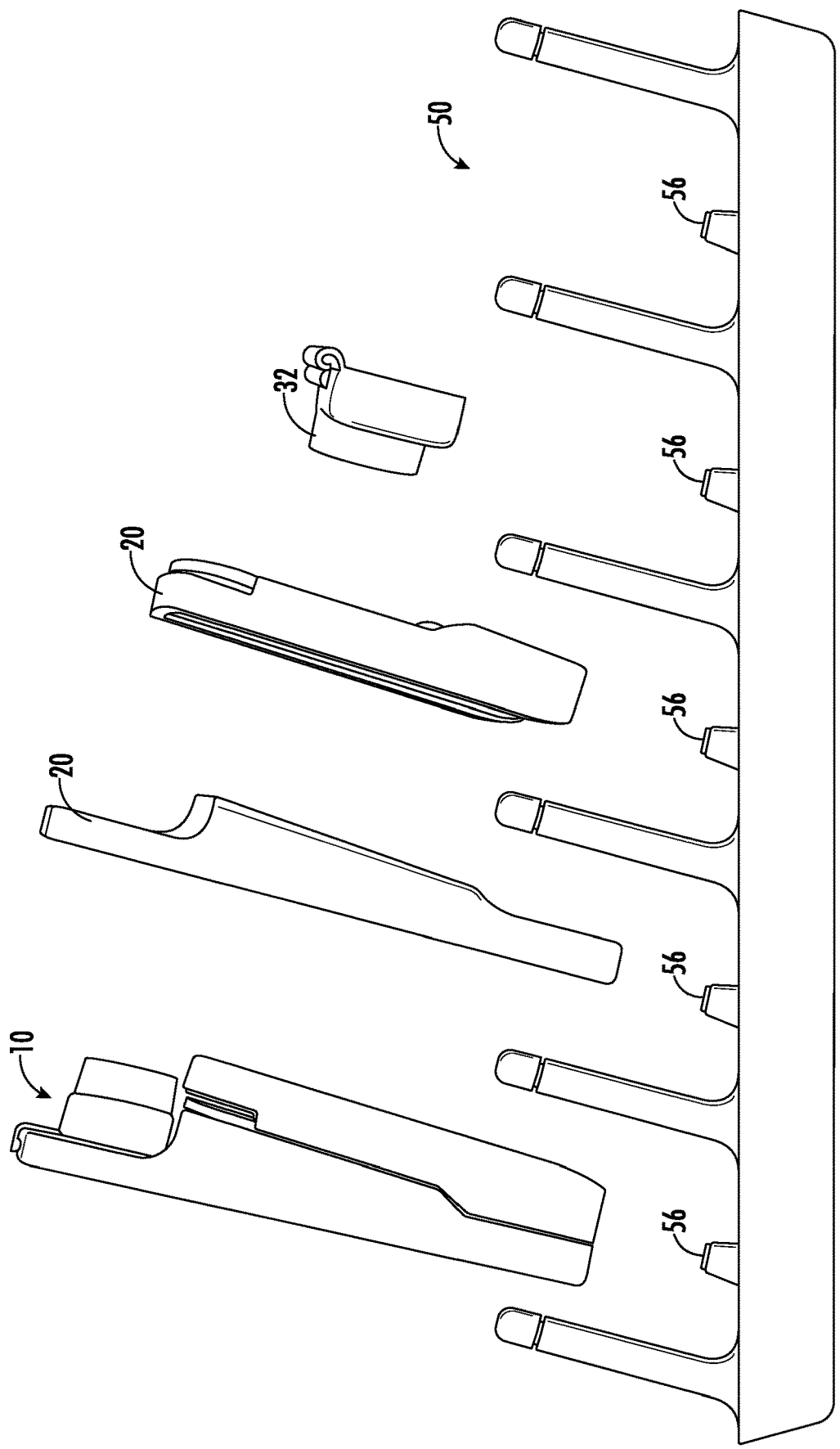
FIG. 10 illustrates a dock for charging the point of sale system according to one embodiment.
Figure 11:
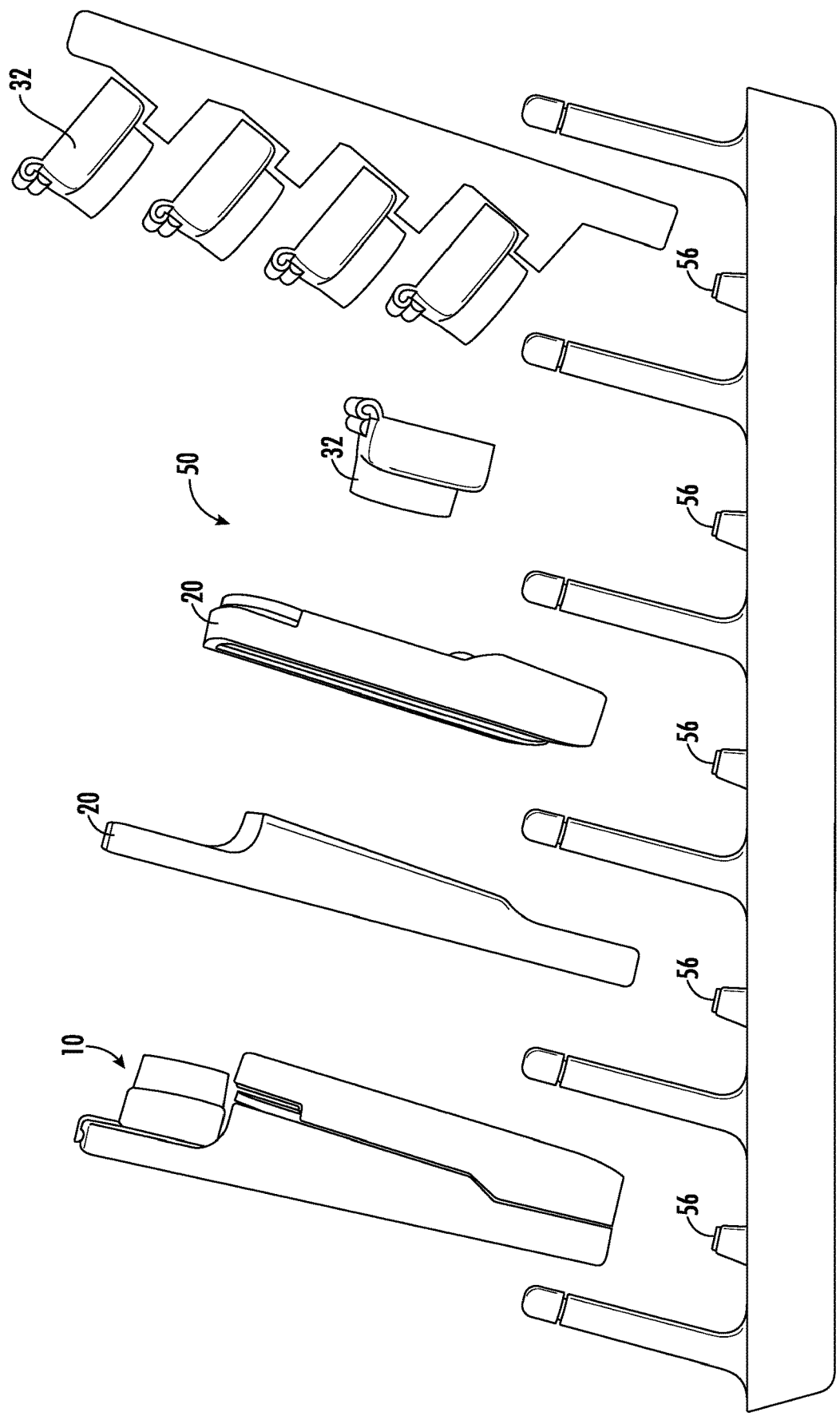
FIG. 11 shows the dock of FIG. 10 receiving various components of the point of sale system.
Figure 12:
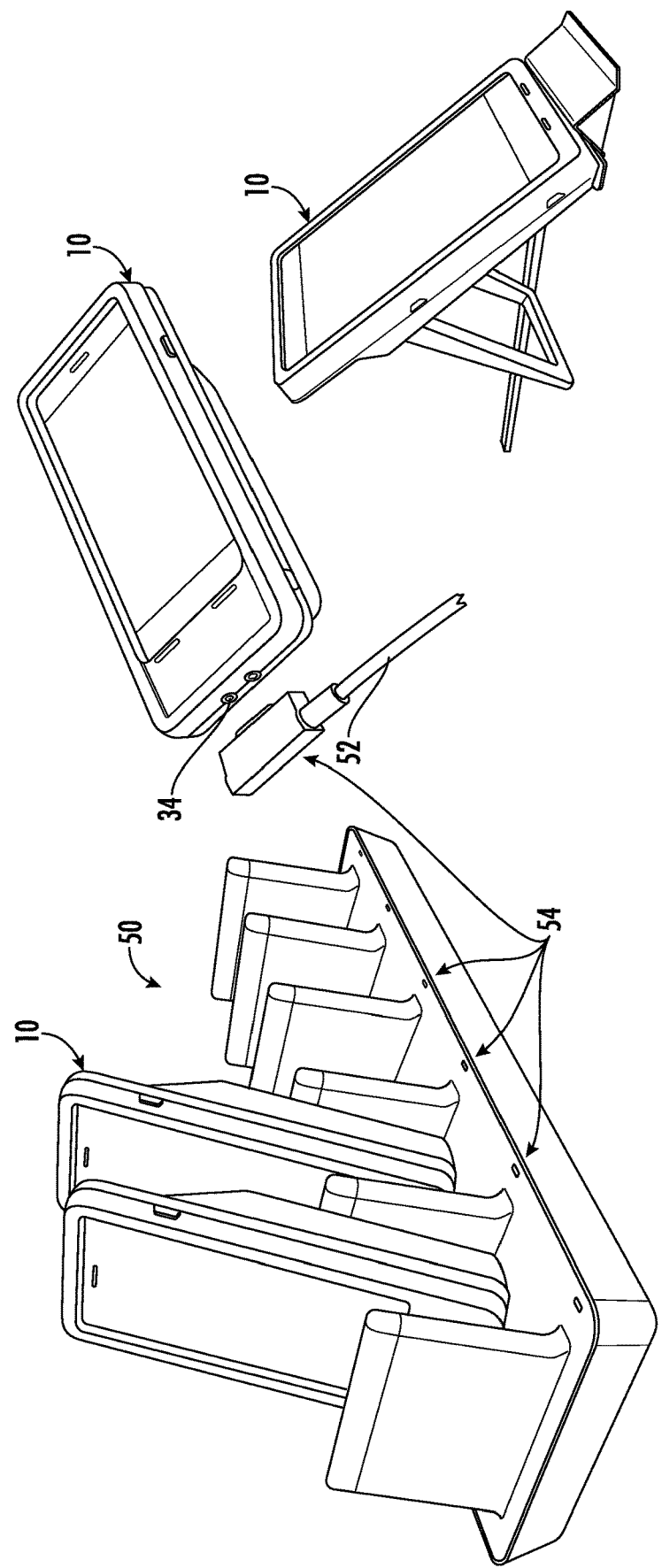
FIG. 12 shows various views of a dock and other means for facilitating charging of a point of sale system according to other embodiments.
Figure 14:
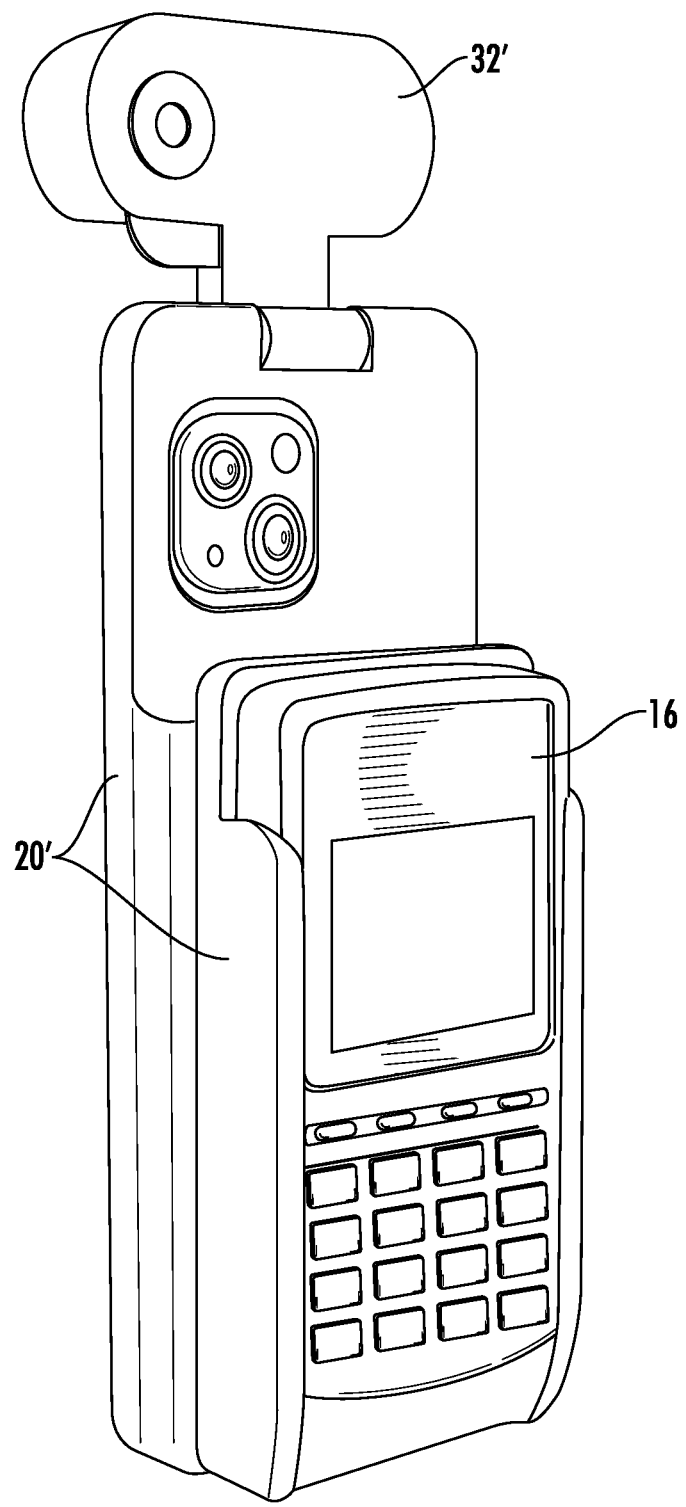
FIG. 14 shows another view of the point of sale system of FIG. 13 with the third shroud in a non-use position.

In some embodiments, the portable electronic device 15, point of sale device 16, and/or accessory device 30 is configured to be charged, such as via a dock 50 or electrical cable 52 connected to a power source (see, e.g., FIGS. 10-12). The dock 50 includes one or more dock interfaces 56 configured to receive any one of the POS system 10, the portable electronic device 15 and associated shroud 20, the POS device 16 and associated shroud 20, and/or the accessory device and associated shroud 32. In some cases, FIG. 11 shows that a bank of accessory devices 30 and associated shrouds 32 may be configured to engage an interface for facilitating charging.

In one embodiment, the shroud 20 of the portable electronic device 15, the shroud 20 of the POS device 16, and the shroud 32 of the accessory device include one or more electrical contact(s) 34 for receiving electrical signals via a dock interface 56 or cable 52. It is understood that the contacts 34 may be configured to transfer power, data, and/or other signals to or from the portable electronic device 15, the POS device 16, and/or the accessory device 30. The interior surface of the shrouds 20 of the portable electronic device 15 and/or point of sale device 16 may include a suitable connector 38 (see, e.g., FIG. 6 showing the shroud of the portable electronic device) configured for electrically connecting the electrical contacts 34 to the portable electronic device, POS device, and/or accessory device 30 (e.g., for facilitating power transfer). Moreover, FIG. 6 shows that each shroud 20 may form an assembly having one or more components, such as an interior shroud with a connector 38 and an exterior shroud. In some cases, the portable electronic device 15 and associated shroud 20 may serve as a "host" device and be configured to charge the portable electronic device and the POS device 16 and/or accessory device 30 via contacts 34 when the portable electronic device is receiving power and the POS device and/or accessory device 30 is attached thereto. In other instances, the portable electronic device 15, the POS device 16, and the accessory device 30 may be configured to be charged independently of one another, which may allow one to estimate a full charge of each of the devices.

Figure 5:
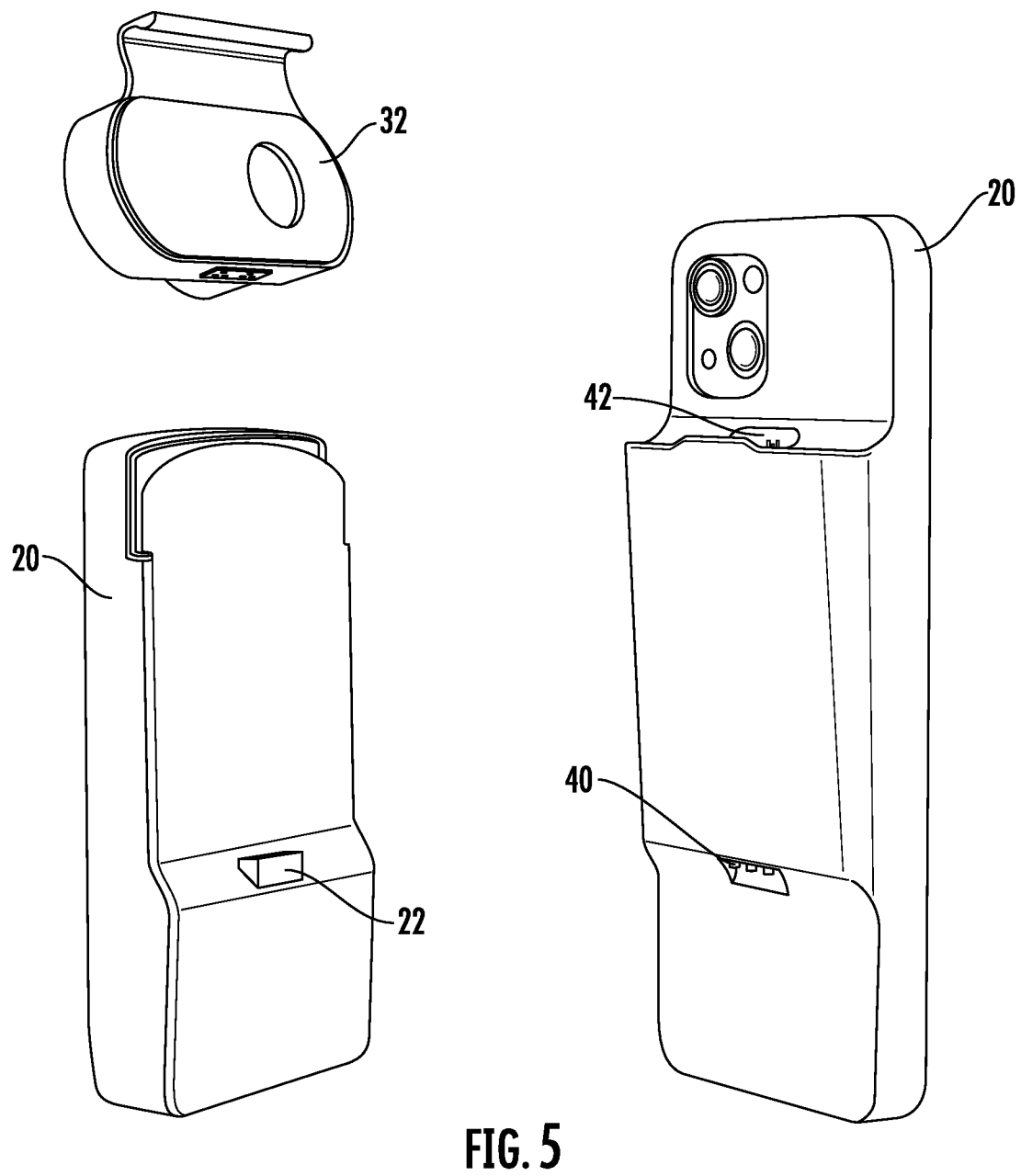
FIG. 5 shows various views of first, second, and third shrouds disengaged from one another according to one embodiment.
Figure 15:
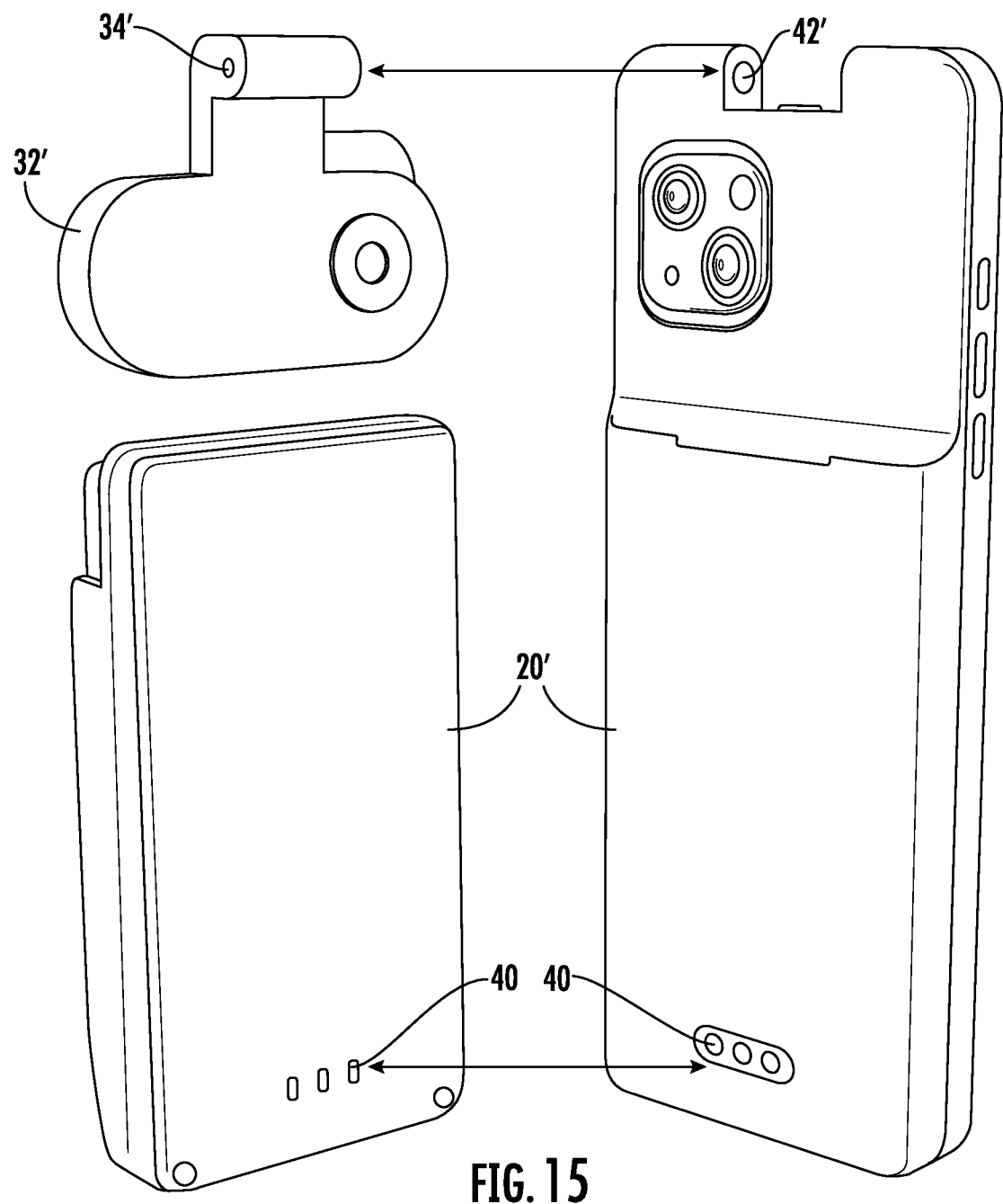
FIG. 15 is another view of the point of sale system in a disassembled state according to one embodiment.
Figure 16:
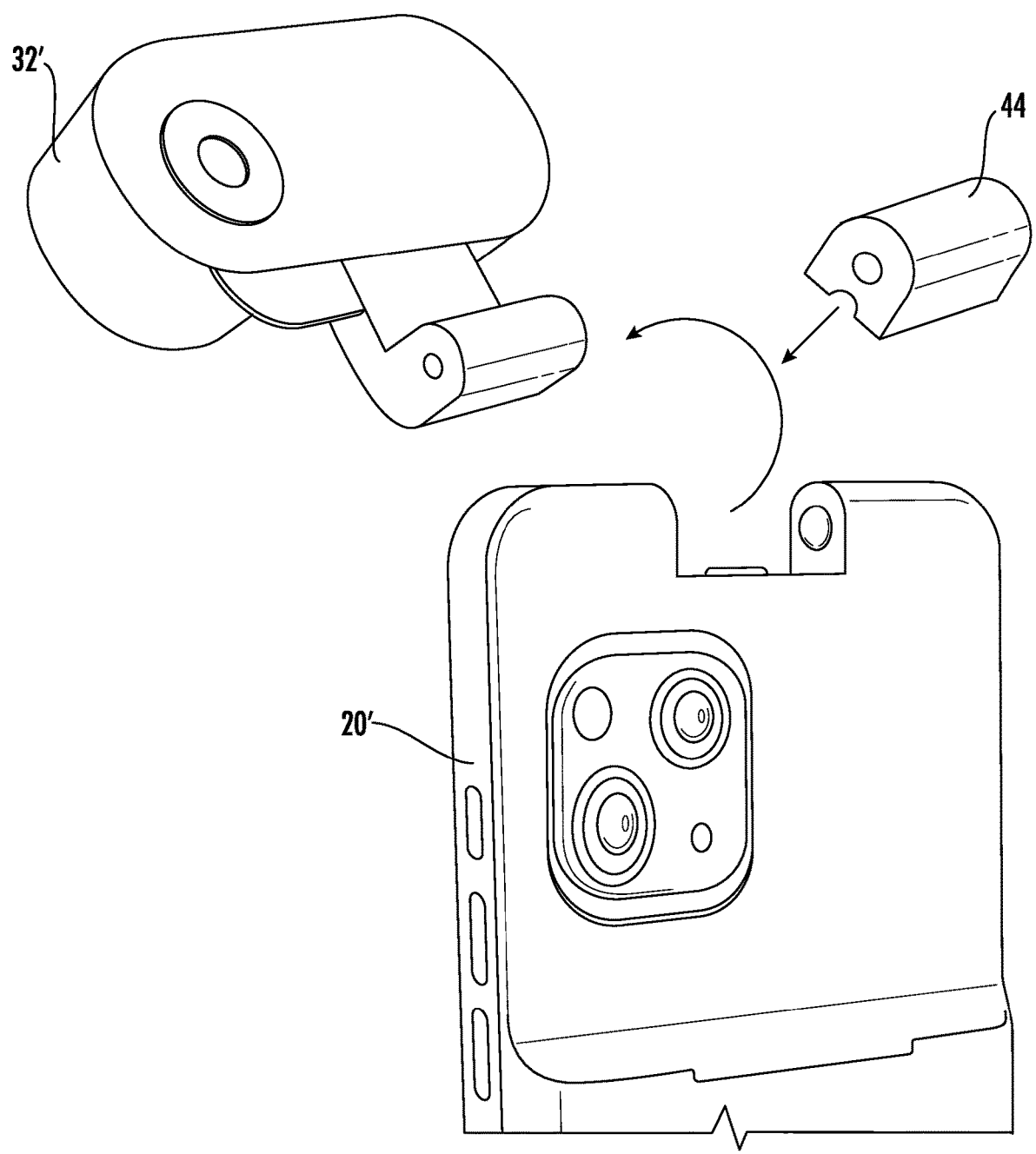
FIG. 16 is an enlarged view of the third shroud of the point of sale system of FIG. 13 removed from the first shroud.

Furthermore, FIG. 5 shows that in some cases, the shroud 20 of the portable electronic device 15 may include one or more electrical contacts 40 and that the shroud of the POS device 16 may include one or more corresponding electrical contacts. See also FIG. 15 where each shroud 20' includes a plurality of electrical contacts 40. Thus, when the shrouds 20 are in engagement with one another, the contacts 40 are configured to mate with and be electrically connected to one another to facilitate communication between the portable electronic device and the POS device. In the illustrated example, the contacts 40 of the portable electronic device 15 are pogo pin contacts. Similarly, the contacts 34 of the shroud 32 may be configured to mate with corresponding electrical contacts 42 of the shroud 20 of the portable electronic device 15 (see, e.g., FIG. 3). Thus, when the shroud 32 is engaged with the shroud 20 of the portable electronic device 15 (a non-hinged position), the contacts 34, 42 may be configured to mate and establish an electrical connection.

Thus, in some embodiments, the contacts 34, 40, 42 are configured to maintain an electrical connection with one another as the shrouds 20, 32 are coupled to one another, thereby ensuring an electrical connection between the portable electronic device, the POS device, and/or the accessory device 32. As such, the portable electronic device 15, the POS device 16, and/or the accessory device 32 are configured to maintain communication with one another. In this way, a transaction can be completed without losing a connection between the portable electronic device and the POS device. In some cases, the contacts 34, 40, 42 provide a USB or hardware-like electrical connection between the portable electronic device, the POS device, and/or the accessory device 32, e.g., via power, data, and ground conductors.

Moreover, redundant contacts 34, 40, 42 may be provided in some instances, which may help to maintain a high-speed electrical connection between the portable electronic device, the POS device, and/or the accessory device 32 via the shrouds 20, 32. Redundant contacts 34, 40, 42 (e.g., ground contacts) may also be provided in some embodiments and act as a switch to prevent live voltage from being delivered without a POS device 16 and associated shroud 20 (or an accessory device 30 and associated shroud 32) being attached to the portable electronic device 15 and associated shroud.

FIGS. 13-16 illustrate another embodiment of a POS system 10'. The POS system 10' is similar to that described above, however, in one example the configuration of shrouds 20', 32' differs. In particular, the shroud 20' for the portable electronic device 15 and shroud 32' may include one or more electrical contacts 34', 42' that are configured to electrically connect to one another for at least the reasons already discussed. In this embodiment, the shroud 32' may be configured to pivot or hinge about the electrical contacts 34', 42' when in engagement with one another. Thus, the contacts 34', 42' may be configured to facilitate attachment of the shroud 20' to the shroud 32' as well as an electrical connection therebetween. The shroud 32' may be configured to pivot relative to the shroud 20' along an axis defined by the electrical contacts 34', 42'.

Figure 17:
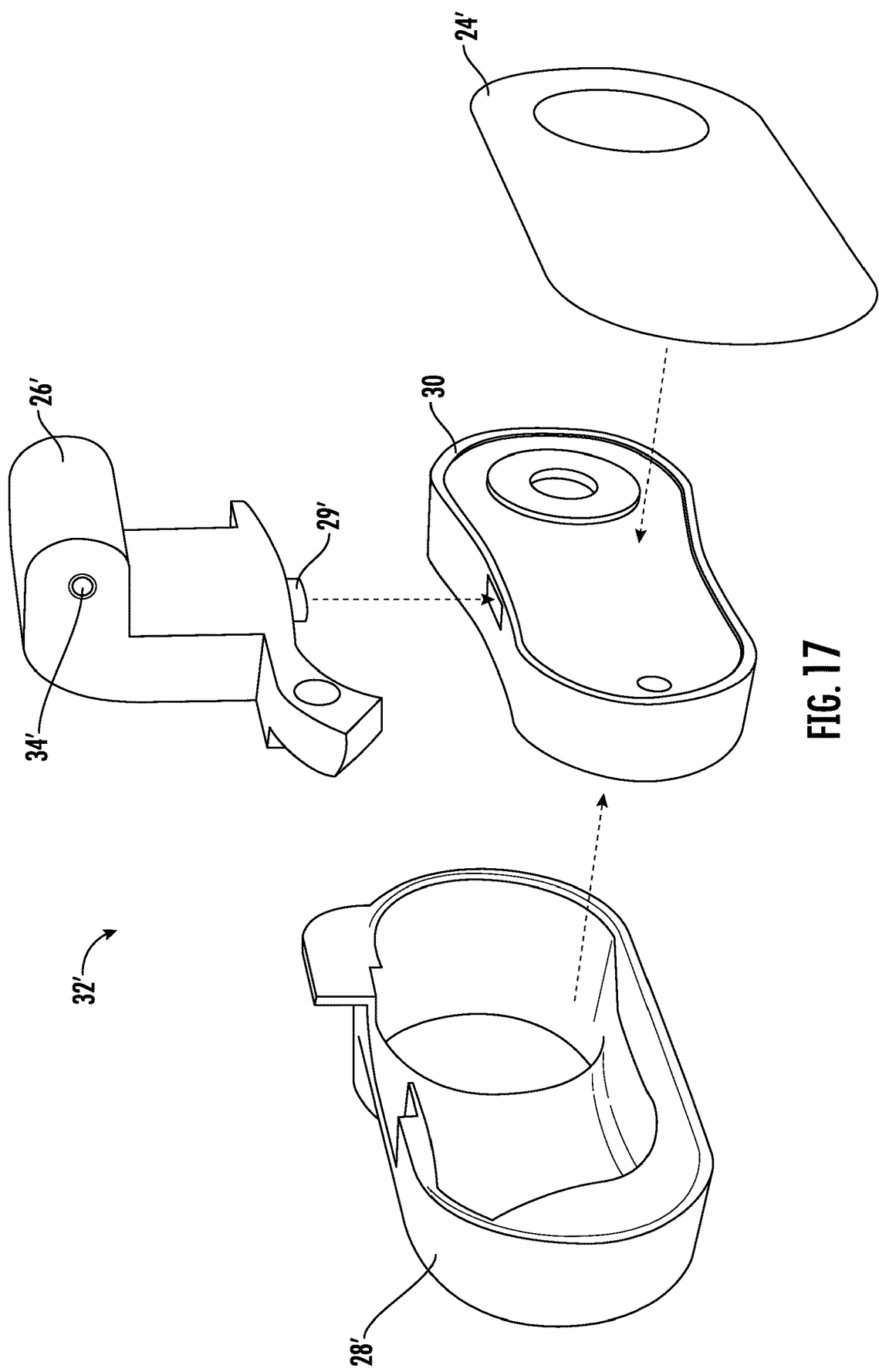
FIG. 17 is shows an exploded view of a third shroud of according to one embodiment.

It is also noted that the shroud 20' may define a recess configured to receive a portion of the shroud 32' for facilitating engagement therebetween. If the shroud 32' is removed, a plug 44 may be configured to be inserted within the recess and engaged with the shroud 20' (see, e.g., FIG. 16). FIG. 17 shows an embodiment of a shroud 32' assembly where a back plate 24' and a front plate 28' are configured to attach to one another and house the accessory device 30. The back plate 24' and front plate 28' may be configured to be attached using various means, such as adhesive and/or fastener(s). A third component 26' is configured to be disposed between the back plate 24' and the front plate 28' and may include one or more conductors 34' as well as a connector 29' that is configured to connect with the accessory device 30.

Figure 18:
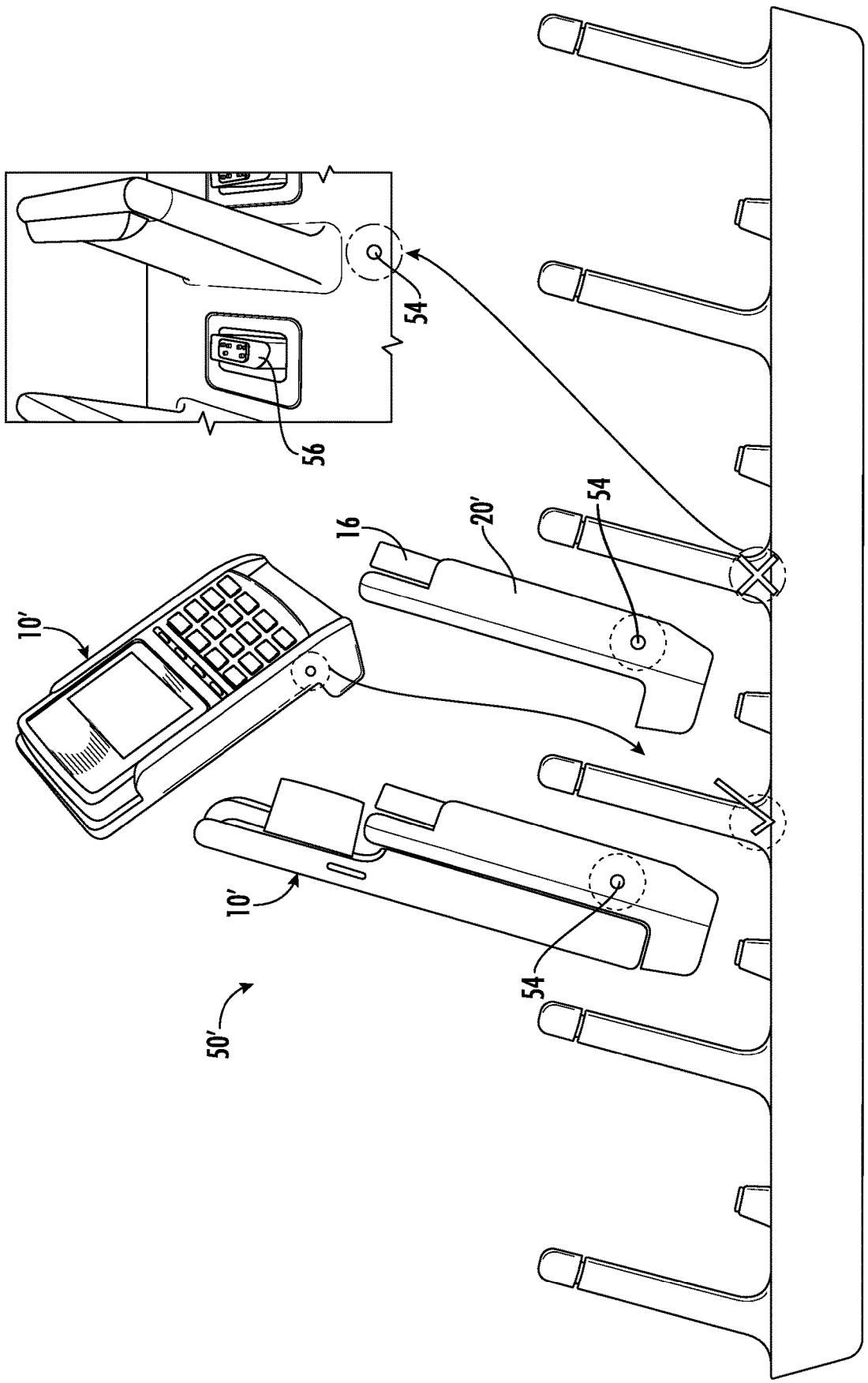
FIG. 18 illustrates a dock for charging a point of sale system according to another embodiment.

Furthermore, FIG. 18 shows another embodiment of a dock 50'. The dock 50' is similar to the dock 50 described above in that the dock is configured to at least charge the portable electronic device 15, point of sale device 16, and accessory device 30. In some embodiments, the dock 50' and/or shrouds 20', 32' may include one or more indicators 54 that are configured to provide an indication of whether the shrouds are docked correctly and in a charging mode. In some cases, the dock 50' will not charge the point of sale device 16 if the shrouds 20' are not in engagement with one another when placed in the dock 50'. In other words, the point of sale device 16 will not charge if placed in the dock 50' alone in some embodiments.

The foregoing has described one or more embodiments of POS systems, devices, and methods. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A point of sale system comprising:
   a portable electronic device;
   a first shroud configured to be removably coupled to the portable electronic device;

a point of sale device configured to communicate with the portable electronic device;
a second shroud configured to be removably coupled to the point of sale device;
an accessory device configured to communicate with the portable electronic device; and
a third shroud configured to be coupled to and at least partially enclose the accessory device,
wherein the first shroud, the second shroud, and/or the third shroud comprises one or more magnets for removably attaching to one another,
wherein each of the first shroud and the second shroud comprises one or more electrical contacts,
wherein the first shroud is configured to be removably coupled to the second shroud to facilitate communication between the portable electronic device and the point of sale device when the one or more electrical contacts of the first and second shrouds are mated with and electrically connected to one another, and
wherein the third shroud is configured to be coupled to the first shroud to facilitate communication between the portable electronic device and the accessory device.

2. The point of sale system of claim 1, wherein the point of sale device and/or the accessory device is configured to communicate data signals with the portable electronic device.

3. The point of sale system of claim 1, wherein the first shroud is configured to be electrically connected to the second shroud and the third shroud when coupled thereto.

4. The point of sale system of claim 1, wherein the first shroud is configured to at least partially enclose the portable electronic device.

5. The point of sale system of claim 1, wherein the second shroud is configured to at least partially enclose the point of sale device.

6. The point of sale system of claim 1, wherein the first shroud, the second shroud, and/or the third shroud additionally comprises one or more engagement members for coupling to one another.

7. The point of sale system of claim 1, wherein the portable electronic device is configured to communicate power signals with the point of sale device when the first shroud is removably coupled to the second shroud.

8. The point of sale system of claim 1, wherein the portable electronic device is configured to communicate power signals with the accessory device when the first shroud is coupled to the third shroud.

9. The point of sale system of claim 1, wherein the accessory device is configured to utilize a camera of the portable electronic device when the third shroud is coupled to the first shroud.

10. The point of sale system of claim 1, wherein the third shroud comprises a hinge configured to facilitate movement of the third shroud relative to the first shroud between a use position and a non-use position.

11. The point of sale system of claim 1, wherein the third shroud is pivotally attached to the first shroud.

12. The point of sale system of claim 1, wherein each of the first shroud and the third shroud comprises one or more electrical contacts configured to mate with and electrically connect to one another.

13. The point of sale system of claim 12, wherein the third shroud is configured to move relative to the first shroud about the one or more electrical contacts between a use position and a non-use position.

14. The point of sale system of claim 1, wherein the third shroud is configured to pivot relative to the first shroud between a use position and a non-use position.

15. The point of sale system of claim 1, wherein the first shroud is configured to be removably attached to the third shroud.

16. The point of sale system of claim 1, wherein each of the first shroud and the second shroud comprises a plurality of electrical contacts, and wherein the plurality of electrical contacts of the first and second shrouds are located on a rear surface of each of the first and second shrouds.

17. The point of sale system of claim 1, wherein each of the first shroud and the third shroud comprises one or more electrical contacts, and wherein the third shroud is configured to be removably coupled to the first shroud to facilitate communication between the portable electronic device and the accessory device when the one or more electrical contacts of the first and third shrouds are mated with and electrically connected to one another.

18. The point of sale system of claim 1, wherein each of the first shroud and the second shroud comprises a connector for electrically connecting the first shroud to the portable electronic device and the second shroud to the point of sale device.

19. The point of sale system of claim 1, wherein the portable electronic device is configured to operate as a host device and to charge the point of sale device when the first shroud is removably coupled to the second shroud.

20. A point of sale system comprising:
a portable electronic device;
a first shroud configured to be coupled to the portable electronic device;
an accessory device configured to communicate with the portable electronic device; and
a second shroud configured to be coupled to the accessory device,
wherein the second shroud is configured to be moved relative to the first shroud between a use position in which the accessory device is configured to operate with the portable electronic device and a non-use position where the accessory device is unable to operate with the portable electronic device, and
wherein the second shroud is configured to be coupled to the first shroud to facilitate communication between the portable electronic device and the accessory device,
wherein each of the first shroud and the second shroud comprises one or more electrical contacts configured to electrically connect to one another, and
wherein the second shroud is configured to move relative to the first shroud about the one or more electrical contacts between the use position and the non-use position.

21. A point of sale system comprising:
a portable electronic device;
a first shroud configured to be removably coupled to the portable electronic device;
a point of sale device configured to communicate with the portable electronic device;
a second shroud configured to be removably coupled to the point of sale device;
an accessory device configured to communicate with the portable electronic device; and
a third shroud configured to be coupled to and at least partially enclose the accessory device,
wherein each of the first shroud and the second shroud comprises a plurality of electrical contacts, and wherein the plurality of electrical contacts of the first and second shrouds are located on a rear surface of each of the first and second shrouds, wherein the first shroud is configured to be removably coupled to the second shroud to facilitate communication between the portable electronic device and the point of sale device when the plurality of electrical contacts of the first and second shrouds are mated with and electrically connected to one another, and wherein the third shroud is configured to be coupled to the first shroud to facilitate communication between the portable electronic device and the accessory device.

\* \* \* \* \*